United States Patent [19]

Giacosa

[11] 4,060,012
[45] Nov. 29, 1977

[54] STEPLESS SPEED CHANGE GEAR FOR MOTOR PROPULSION SYSTEMS OF MOTOR VEHICLES

[75] Inventor: Dante Giacosa, Turin, Italy

[73] Assignee: Sira Societa' Industriale Richerche Automotoristiche, Turin, Italy

[21] Appl. No.: 680,555

[22] Filed: Apr. 27, 1976

[30] Foreign Application Priority Data

May 9, 1975 Italy .................................. 68183/75

[51] Int. Cl.² ........................................ F16H 37/00
[52] U.S. Cl. ................................................ 74/689
[58] Field of Search .............................. 74/689, 751

[56] References Cited

U.S. PATENT DOCUMENTS

| | | | |
|---|---|---|---|
| 3,203,277 | 8/1965 | General | 74/689 |
| 3,340,749 | 9/1967 | Magg et al. | 74/689 |
| 3,479,908 | 11/1969 | Kress et al. | 74/689 X |
| 3,641,843 | 2/1972 | Lemmens | 74/751 |
| 3,850,050 | 11/1974 | Lemmens | 74/689 |

*Primary Examiner*—Samuel Scott
*Assistant Examiner*—Lance W. Chandler
*Attorney, Agent, or Firm*—Sughrue, Rothwell, Mion, Zinn and Macpeak

[57] ABSTRACT

A stepless speed change gear of the type in which a main shaft and a driven shaft have respective pulleys formed by plates of controlled variable separation, interconnected by a vee belt. A drive shaft is housed coaxially within the main shaft and connected at one end through a friction clutch with a driving shaft of an engine, the other end of the drive shaft being connected to the main shaft through a reversing gear including an epicyclic gear train.

3 Claims, 1 Drawing Figure

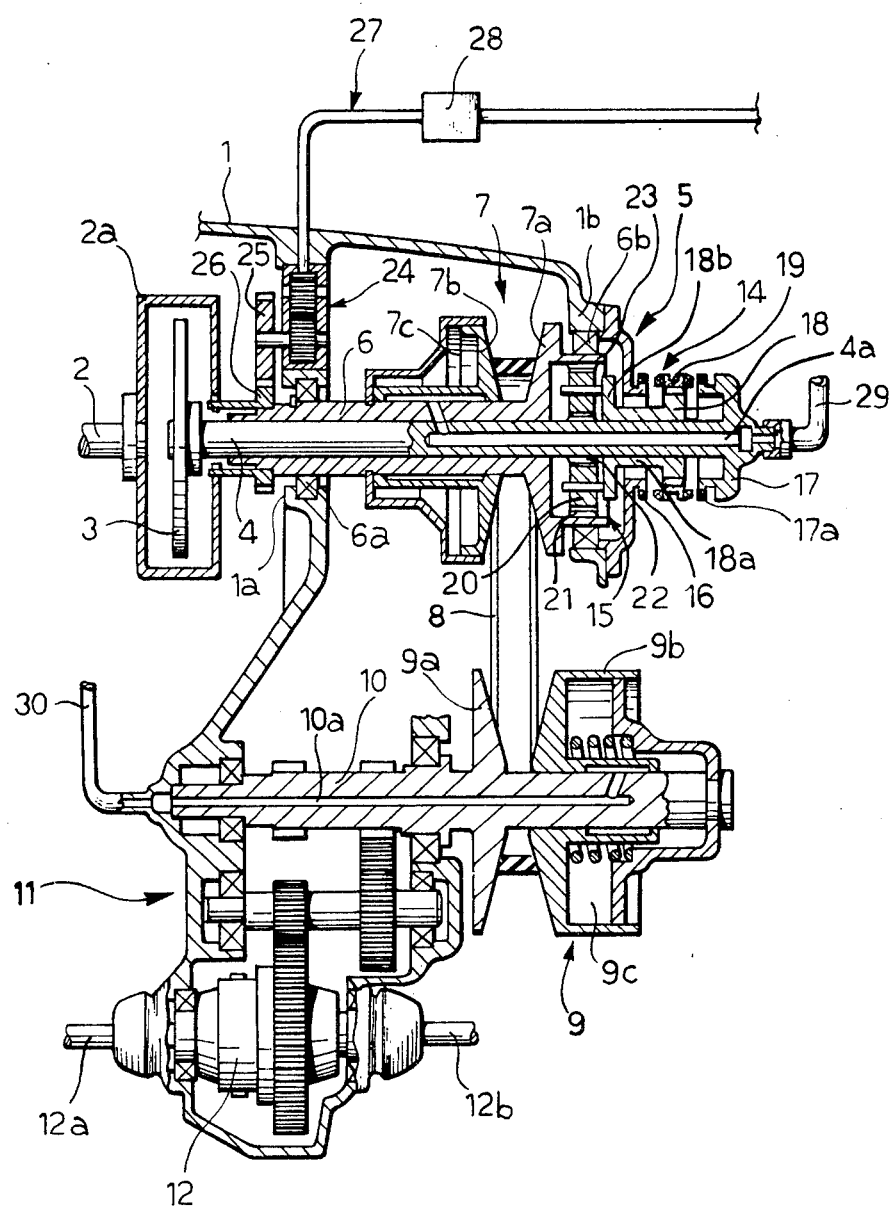

STEPLESS SPEED CHANGE GEAR FOR MOTOR PROPULSION SYSTEMS OF MOTOR VEHICLES

The present invention relates to stepless speed change gears for motor vehicle propulsion systems, of the type comprising a main input drive shaft which receives the drive for the motor propulsion system and which supports a driving pulley, a driven shaft supporting a driven pulley, and a V-section endless belt interconnecting the two pulleys, each pulley being of the type comprising two facing conical plates, one of which is fixed to its support shaft and the other of which is slidable axially upon the said shaft so as to allow radial movement of the interposed V-section belt, and an hydraulic circuit suitable for controlling the axial movement of the slidable plate of each pulley, the hydraulic circuit including a pump and a regulating circuit adapted to feed in oil under pressure into a chamber adjacent to the slidable plate of each pulley to effect movement of said plate.

The technical problem fundamental to the invention is to provide a stepless speed change gear of the type described, of smaller size in the axial direction than the abovementioned previously known gears so as to allow its use in motor vehicles fitted with a transversely mounted motor propulsion system.

According to the present invention a stepless speed change gear of the above type is characterised in that the main shaft is hollow, and there is mounted coaxially within the main shaft a rotatable drive shaft connected at one end to the driving shaft by means of a friction clutch, and at the other end to the main shaft by means of a reversing gear which can assume, under external control, two extreme operative positions, in the first of which the main shaft rotates in the same direction as the driving shaft, and in the other of which the main shaft rotates in the opposite direction to the driving shaft, and a neutral position in which the main shaft is idle relative to the drive shaft.

The aforesaid characteristic allows the reversing gear to be arranged upstream of the drive pulley, which brings about a reduction in the axial dimension of the speed change gear.

The invention will now be described, by way of non-limiting example, with reference to the attached drawing which illustrates a preferred practical embodiment, in a diagrammatic axial section, of a stepless speed change gear according to the invention.

In the drawing reference numeral 1 indicates a fixed support structure of the stepless speed change gear and reference numeral 2 indicates the driving shaft of a motor propulsion unit (not shown). The driving shaft 2 carries at one end a hollow flywheel 2a within which a friction clutch plate 3 is located. The plate 3 is carried by one end of a drive shaft 4 to which it transmits the drive. The drive shaft 4 is housed coaxially within a hollow shaft 6, herein called the main shaft, to which it transmits drive by means of a reversing gear 5 mounted on the end of the shaft 4 opposite to the friction clutch plate 3. Upon the main shaft 6 there is mounted a driving pulley 7 consisting of two axially spaced apart conical plates 7a and 7b having their conical surfaces facing each other. The conical plate 7a is fixed to the main shaft 6 and the plate 7b is slidable axially on the main shaft 6.

The driving pulley 7 transmits drive, by means of an endless V-section belt 8, to a drive pulley 9 mounted upong a shaft 10, herein called the driven shaft. The driven pulley 9 comprises two conical plates, 9a and 9b having their conical surfaces facing each other, of which the plate 9a is fixed to the driven shaft 10 and the plate 9b facing it is slidable axially on the driven shaft.

The driven shaft 10 transmits drive, through a reduction gear 11 and a differential 12 to the axles 12a and 12b of the front wheels (not illustrated) of the vehicle. The reversing gear 5 comprises a toothed gear device 14 and an epicyclic gear train 15. The gear device 14 includes a first externally toothed flange 16 formed on the fixed structure 1 of the speed change gear and a second flange 17, formed on the end of the drive shaft 4 opposite to the clutch plate 3 and having an external ring gear 17a. An annular plate 18 is interposed between the two flanges 16 and 17. An axially slidable control collar 19 is splined to the annular plate 18 and carries two sets of teeth or dogs. By moving the collar 19 to the right a drive connection is established between the annular plate 18 and the flange 17 of the drive shaft 4. By moving the collar 19 in the opposite direction a drive connection is established between the annular plate 18 and the flange 16. The annular plate 18 is carried by a cylindrical sleeve 18a fixed to a planet carrier or spider structure 18b of the epicyclic gear train 15. The planet carrier structure 18b supports a number of planet wheels 20 interposed between a central toothed gear 22 attached to or formed upon the drive shaft 4 and constituting the sun wheel of the epicyclic gear train 15, and an internally toothed ring 21 disposed on the inner surface of a cylindrical shell appendage 23 of the main shaft 6 and constituting the outer ring of the epicyclic gear train 15. The cylindrical shell appendage 23 is fixed to the conical plate 7a of the driving pulley 7.

In the first extreme axial position in which the control collar 19 connects the annular plate 18 with the flange 17 of the drive shaft 4, the planet carrier structure 18b is coupled to and rotates with the said drive shaft.

Consequently, the driving pulley 7 and the main shaft 6 will also be fixed relative to the drive shaft 4 and hence they rotate in the same direction and at the same angular speed as the latter.

In the opposite, second, extreme axial position of the control collar 19 the planet carrier structure 18b will be fixed relative to the fixed support structure 1 of the gear change. In this position the driving pulley 7 and the main shaft 6 rotates in the opposite direction to the drive shaft 4 and at an angular speed reduced relatively to the latter.

In the neutral position of the control collar 19 between the two extreme positions the main shaft 6 is idle relative to the drive shaft 4.

The support structure 1 of the gear change has, in an intermediate position between the clutch plate 3 and the driving pulley 7, a lateral wall 1a within which there is housed a gear pump 24. The gear pump 24 is driven, by means of a driven gear 25 meshing with a driving gear 26 fixed to the flywheel 2a, from the driving shaft 2 of the motor propulsion system. The pump 24 feeds oil under pressure into a circuit 27 including a control valve device 28 of known type. The control valve device 28 feeds the oil under pressure through a pipe 29 into a duct 4a within the drive shaft 4. This oil is fed through the duct 4a into a chamber 7c adjaccent to the slidable conical plate 7b of the driving pulley 7. The oil under pressure supplied to the chamber 7c effects movement of the plate 7b and thus changes the diameter of the partial loop formed in the V-section belt on the driving pulley 7. The control valve device 28 also supplies oil under pressure through a pipe 30 into a duct 10a within the driven shaft 10. From the duct 10a the oil passes into a chamber 9c adjacent the slidable plate 9b of the driven pulley 9 to effect axial displacement of the plate 9b, allowing change in the diameter of the partial loop formed in the belt 8 of the driven pulley 9. In this way a change in the transmission ratio between the main shaft 6 and the driven shaft 10 is effected by the adjustment device 28.

The main shaft 6 is supported by the fixed structure 1 of the speed change gear by means of two bearing elements 6a and 6b. The bearing element 6a is situated in correspondence with the lateral wall 1a of the structure 1; the bearing element 6b is disposed on the outer surface of the cylindrical shell appendage 23 and is seated in an appendage 1b of the fixed structure 1.

Naturally practical embodiments of the invention and details of construction may be varied widely from what has been described and illustrated without nevertheless going beyond the scope of this invention.

What is claimed is:

1. Stepless speed change gear for monitor propulsion systems of motor vehicles, of the type comprising:
   a driving shaft connectible to the motor propulsion system;
   a main shaft which receives drive transmission from the driving shaft, and which supports a driving pulley,
   a driven shaft which supports a driven pulley;
   a V-section endless belt would upon the two pulleys, each pulley being of the type consisting of two plates, with conical surfaces facing each other, one of which plates if fixed to its supporting shaft and the other of which is slidable axially upon its supporting shaft so as to allow corresponding radial movement of the portions of the interposed endless belt between said plates, and
   an hydraulic circuit for controlling the position of the slidable plate of each pulley relative to the associated fixed plate and comprising a pump, including an adjustment device through which oil is fed under pressure into respective chambers adjacent to the slidable plates of the respective pulleys,
   wherein the improvements consists in:
      the main shaft being hollow, and there being mounted coaxially within the main shaft a rotatable drive shaft
      a friction clutch at one end of said drive shaft for connecting the latter to the driving shaft, and
      a reversing gear at the other end of said drive shaft connecting the latter to the main shaft,
      said reversing gear having external control means under which it can assume two extreme operating positions, in the first of which the main shaft rotates in the same direction as the driving shaft, and in the other of which the main shaft rotates in the opposite direction to the driving shaft, and a neutral position in which the main shaft is idle relative to the driving shaft, and wherein the reversing gear comprises, in combination:
      a cylindrical shell appendage at the end of the main shaft adjacent the reversing gear,
      an epicyclic gear train with cylindrical gears housed in said shell appendage of the main shaft, said train consisting of a toothed ring fixed to the inner wall of the cylindrical shell, a central toothed ring on the driving shaft, a number of toothed planet wheels interposed between and meshing with said toothed rings and the central gear, and a planet carrier structure carrying said planet wheels;
      a toothed device consisting of an annular plate, fixed to the planet carrier structure a first externally toothed flange upon the fixed support structure, said first flange being disposed between the planet carrier structure and the annular plate and facing one side of the latter, a second externally toothed flange fixed to that end of the drive shaft which is adjacent the reversing gear and facing the opposite side of the annular plate from the first flange, and
      an axially slidable control collar splined to said annular plate and having two sets of teeth or dogs;
   the said collar having a first extreme axial position, in which it couples the annular plate with the second flange, and a second extreme axial position in which it couples the annular plate with the first flange.

2. Stepless speed change gear for motor propulsion systems of motor vehicles, of the type comprising:
   a driving shaft connectible to the motor propulsion system;
   a main shaft which receives drive transmission from the driving shaft, and which supports a driving pulley,
   a driven shaft which supports a driven pulley;
   a V-section endless belt wound upon the two pulleys, each pulley being of the type consisting of two plates, with conical surfaces facing each other, one of which plates is fixed to its supporting shaft and the other of which is slidable axially upon its supporting shaft so as to allow corresponding radial movement of the portions of the interposed endless belt between said plates, and
   an hydraulic circuit for controlling the position of the slideable plate of each pulley relative to the associated fixed plate and comprising a pump, including an adjustment device through which oil is fed under pressure into respective chambers adjacent to the slidable plates of the respective pulleys,
   wherein the improvements consists in:
      the main shaft being hollow, and there being mounted coaxially within the main shaft a rotatable drive shaft
      a friction clutch at one end of said drive shaft for connecting the latter to the driving shaft, and
      a reversing gear at the other end of said drive shaft connecting the latter to the main shaft,
      said reversing gear having external control means under which it can assume two extreme operating positions, in the first of which the main shaft rotates in the same direction as the driving shaft, and in the other of which the main shaft rotates in the opposite direction to the driving shaft, and a neutral position in which the main shaft is idle relative to the driving shaft, and
      said pump of the hydraulic circuit is housed in a lateral wall of the said fixed support structure disposed between the clutch and the drive pulley of the main shaft, and further including a gear fixed to the driving shaft and driving said pump.

3. The gear change defined in claim 2, including two bearing elements supporting the main shaft in the fixed support structure of the gear change, one of said bearing elements being carried on the lateral wall of the said fixed structure which houses the pump and the other said bearing element being carried by an appendage on the said support structure disposed externally of the cylindrical shell appendage of the main shaft.

* * * * *